United States Patent Office.

MAX H. ISLER, OF MANNHEIM, GERMANY, ASSIGNOR TO THE BADISCHE ANILIN AND SODA FABRIK, OF LUDWIGSHAFEN, GERMANY.

PRODUCT FROM DINITRO-NAPHTHALENE AND PROCESS OF MAKING SAME.

SPECIFICATION forming part of Letters Patent No. 619,181, dated February 7, 1899.

Application filed December 27, 1897. Serial No. 663,712. (Specimens.)

*To all whom it may concern:*

Be it known that I, MAX H. ISLER, a citizen of the Swiss Republic, residing at Mannheim, in the Grand Duchy of Baden and Empire of Germany, have invented new and useful Improvements in the Manufacture and Production of New Products from Aromatic Nitro Derivatives, (for which patents were obtained in Germany November 12, 1895, No. 90,414, and June 27, 1896, No. 91,391; in England July 6, 1896, No. 14,955, and in France July 13, 1896, No. 258,037,) of which the following is a specification.

I have discovered that a complete chemical change is effected if 1.8 or 1.5 dinitro-naphthalene be added to weak fuming sulfuric acid and exposed to its action at ordinary temperature for a short time, new products resulting which by further treatment in various ways yield coloring-matters.

The following example will serve to illustrate the manner in which my invention can best be carried into practical effect. The parts are by weight.

*Example—Production of a new product from 1.8 dinitro-naphthalene.*—Add gradually about ten (10) parts of 1.8 dinitro-naphthalene to about fifty (50) parts of fuming sulfuric acid containing about twelve to twenty-three per cent. (12-23%) free anhydride ($SO_3$) and stir the mixture while maintaining the temperature at about forty to fifty degrees centigrade (40-50° C.) until a portion of the mass poured into water dissolves in caustic soda, yielding a yellow solution. When this point is attained, pour the mass into water and collect the precipitate on the filter. If it be desired to purify the product, it can be recrystallized from glacial acetic acid. The new body so obtained is not a coloring-matter, but it is endowed with great chemical activity and is capable of entering into a large number of reactions by which coloring-matters can be obtained. Thus, for instance, on treatment with fuming sulfuric acid containing about forty per cent. (40%) free anhydride, ($SO_3$,) preferably in the presence of sulfur, coloring-matter is obtained which is soluble in water and dyes chrome-mordanted wool yielding brownish-yellow shades which are fast against the action of light and milling. Coloring-matters can also be obtained in many other ways from the said new body. For example, by treatment with sulfuric acid in various strengths, with or without the addition of boracic acid or similar reagents, brown to red coloring-matters can be obtained. Dyes can also be obtained by treating the new product with caustic soda or by nitrating it. Further, on reducing, a base is obtained which can be used as a component in the manufacture of azo dyes.

The product can be recognized in the following manner: When it is dissolved in dilute caustic soda and a little zinc-dust is added, the solution shows a beautiful red color. By treatment with fuming sulfuric acid or by treating with caustic soda it yields a brown dyestuff suited for dyeing wool.

In a manner similar to that described in the above example a new product can be obtained from the 1.5 dinitro-naphthalene, and this body similarly yields on treatment, as aforesaid, coloring-matters which differ in shade from the corresponding products obtained from the isomeric dinitro-naphthalene.

Now what I claim is—

1. The process for the production of new bodies by submitting the herein-described dinitro-naphthalene to the action of weak fuming sulfuric acid containing not more than twenty-three per cent. $SO_3$, substantially as hereinbefore described.

2. As a new article of manufacture the new product which results by submitting 1.8 dinitro-naphthalene to the action of weak fuming sulfuric acid and which by treatment with fuming sulfuric acid or by heating with caustic soda it yields a brown dyestuff suited for dyeing wool; when it is dissolved in dilute caustic soda and a little zinc-dust is added the solution shows a beautiful red color, all substantially as hereinbefore described.

In testimony whereof I have hereunto set my hand in the presence of two subscribing witnesses.

MAX H. ISLER.

Witnesses:
GUSTAV L. LICHTENBERGER
BERNHARD C. HESSE.